United States Patent
Salter et al.

(10) Patent No.: US 10,137,829 B2
(45) Date of Patent: Nov. 27, 2018

(54) SMART DROP OFF LIGHTING SYSTEM

(71) Applicant: Ford Global Technologies, LLC, Dearborn, MI (US)

(72) Inventors: Stuart C. Salter, White Lake, MI (US); Pietro Buttolo, Dearborn Heights, MI (US); Cornel Lewis Gardner, Romulus, MI (US); James J. Surman, Clinton Township, MI (US); James Stewart Rankin, II, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 15/287,052

(22) Filed: Oct. 6, 2016

(65) Prior Publication Data
US 2018/0099609 A1    Apr. 12, 2018

(51) Int. Cl.
*B60Q 3/00*       (2017.01)
*B60Q 3/02*       (2006.01)

(52) U.S. Cl.
CPC ............. *B60Q 3/00* (2013.01); *B60Q 3/0293* (2013.01)

(58) Field of Classification Search
CPC ................................ B60Q 3/00; B60Q 3/0293
USPC ............................................................. 701/36
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,709,453 A | 1/1998 | Krent et al. | |
| 5,752,760 A * | 5/1998 | Dealey, Jr. | ............... B60Q 3/64 362/478 |
| 5,839,718 A | 11/1998 | Hase et al. | |
| 5,857,758 A * | 1/1999 | Dealey, Jr. | ............... B60Q 3/64 362/223 |
| 6,031,511 A | 2/2000 | DeLuca et al. | |
| 6,117,362 A | 9/2000 | Yen et al. | |
| 6,238,075 B1 * | 5/2001 | Dealey, Jr. | ........... G02B 6/0005 362/223 |
| 6,260,988 B1 | 7/2001 | Misawa et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |

(Continued)

FOREIGN PATENT DOCUMENTS

| CN | 101337492 A | 1/2009 |
|---|---|---|
| CN | 201169230 Y | 2/2009 |

(Continued)

*Primary Examiner* — Muhammad Shafi
(74) *Attorney, Agent, or Firm* — Vichit Chea; Price Heneveld LLP

(57) ABSTRACT

A lighting system is provided herein. The lighting system includes a number of lights and a portable electronic device carried by a vehicle occupant. A controller is in communication with a sensing system and configured to detect a cabin location of the electronic device, assign a seating area to the electronic device, and operate only the lights associated with the seating area based on information indicative of an impending departure of the vehicle occupant from the vehicle.

9 Claims, 3 Drawing Sheets

(56) References Cited

U.S. PATENT DOCUMENTS

| | | |
|---|---|---|
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,354,182 B2 | 4/2008 | Bartels |
| 7,441,914 B2 | 10/2008 | Palmer et al. |
| 7,458,698 B2 | 12/2008 | Heathcock et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,876,205 B2 | 1/2011 | Catten et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,922,388 B2 | 12/2014 | Nykerk |
| 8,937,454 B2 | 1/2015 | Baarman et al. |
| 8,952,341 B2 | 2/2015 | Kingsley et al. |
| 8,963,705 B2 | 2/2015 | Miller et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,442,888 B2 | 9/2016 | Stanfield et al. |
| 9,579,987 B2 | 2/2017 | Penilla et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0021955 A1* | 1/2009 | Kuang ............... H05B 33/0803 362/479 |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Gally et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0288832 A1 | 9/2014 | Hoch et al. |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0274067 A1* | 10/2015 | Salter ................ H05B 37/0218 362/510 |
| 2015/0307020 A1* | 10/2015 | Salter ................ B60Q 1/2696 362/510 |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0082880 A1 | 3/2016 | Co et al. |
| 2016/0214535 A1 | 7/2016 | Penilla et al. |
| 2016/0236613 A1 | 8/2016 | Trier |
| 2017/0213165 A1 | 7/2017 | Stauffer et al. |

FOREIGN PATENT DOCUMENTS

| | | |
|---|---|---|
| CN | 201193011 Y | 2/2009 |
| CN | 101480937 A | 7/2009 |
| CN | 202357840 U | 8/2012 |
| CN | 202847413 U | 4/2013 |
| CN | 103312741 A | 9/2013 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2014068440 A1 | 5/2014 |

\* cited by examiner

SMART DROP OFF LIGHTING SYSTEM

FIELD OF THE INVENTION

The present invention generally relates to lighting systems of a vehicle, and more particularly, to lighting systems capable of being operated during the departure of an occupant from the vehicle.

BACKGROUND OF THE INVENTION

Some vehicles feature lighting systems that are operable during a departure event of an occupant from a vehicle. As such features gain in popularity, there is a need for a lighting system that can be personalized to the occupant leaving the vehicle.

SUMMARY OF THE INVENTION

According to one aspect of the present invention, a lighting system of a vehicle is provided. The lighting system includes a number of lights and a portable electronic device carried by a vehicle occupant. A sensing system is provided for detecting the presence of the electronic device. A controller is in communication with the sensing system and is configured to selectively operate the lights based on a detected cabin location of the electronic device and information indicative of an impending departure of the vehicle occupant from the vehicle.

According to another aspect of the present invention, a lighting system is provided. The lighting system includes a number of lights and a portable electronic device carried by a vehicle occupant. A controller is in communication with a sensing system and configured to detect a cabin location of the electronic device, assign a seating area to the electronic device, and operate only the lights associated with the seating area based on information indicative of an impending departure of the vehicle occupant from the vehicle.

According to yet another aspect of the present invention, a method of controlling lights of a vehicle is provided. The method includes providing lights, each associated with a seating area of the vehicle and using a controller coupled to a sensing system to: detect a portable electronic device carried by a vehicle occupant; assign the portable electronic device to a corresponding seating area; and operate only the lights associated with the corresponding seating area based on information indicative of an impending departure of the vehicle occupant from the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
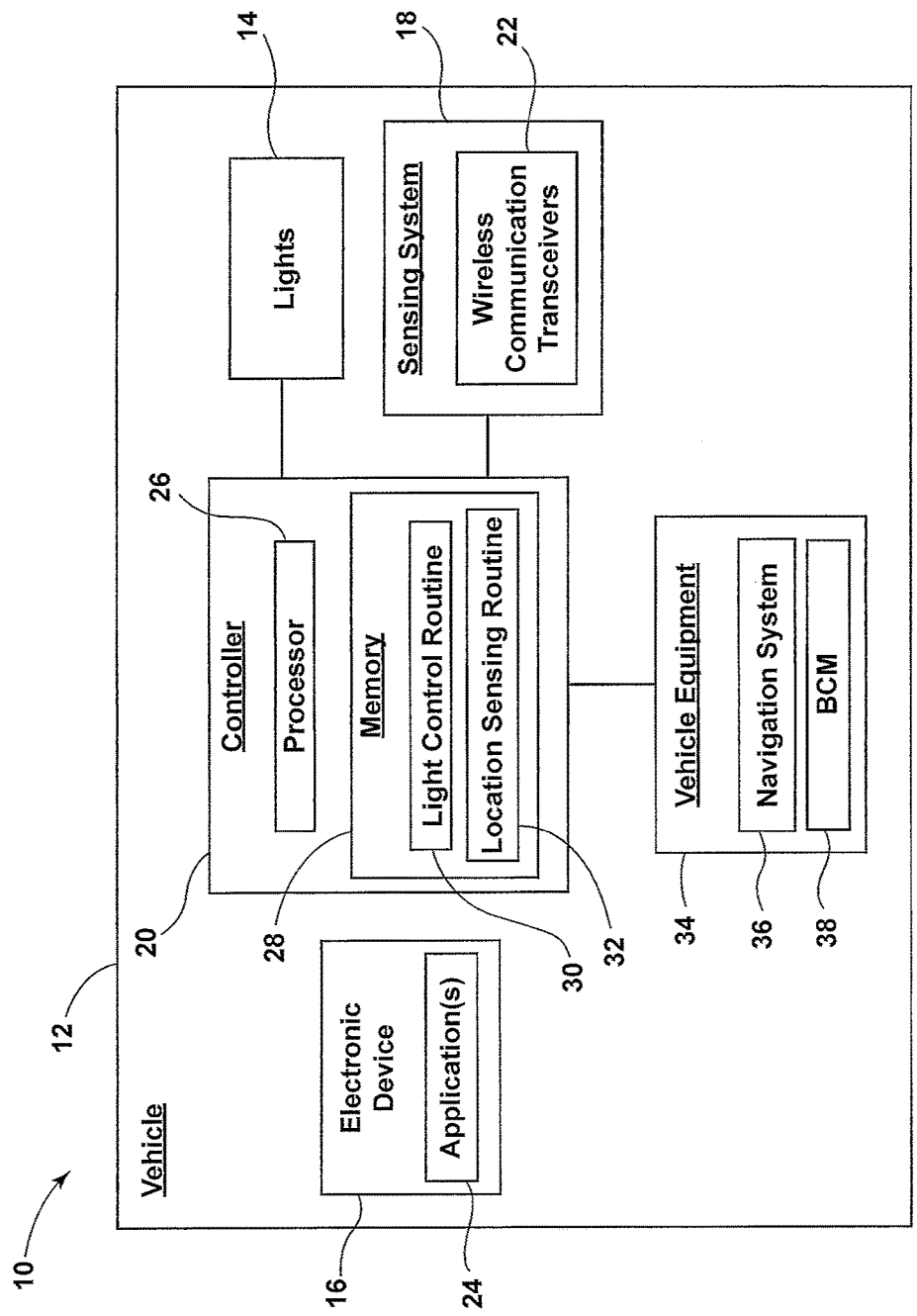
FIG. 1 is a block diagram of a lighting system of a vehicle.

Referring to FIG. 1, a lighting system 10 of a vehicle 12 is shown according to one embodiment. The lighting system 10 includes a number of lights 14 and a portable electronic device 16 carried by a vehicle occupant. The lighting system 10 also includes a sensing system 18 for detecting the presence of the electronic device 16 and a controller 20 in communication with the sensing system 18 and configured to selectively operate the lights 14 based on a detected cabin location of the electronic device 16 and information indicative of an impending departure of the vehicle occupant from the vehicle 12.

In the depicted embodiment, the lights 14 may include a plurality of lights each located on the exterior or the interior of the vehicle 12. The lights 14 may include lights that are commonly provided on vehicles and/or specifically adapted to the vehicle 12 for the purposes of implementing the lighting system 10 described herein. For example, the lights 14 may include interior/exterior grab handle lights, overhead lights, footwell lights, map lights, dome lights, as well as a variety of other interior/exterior lights known in the art. The electronic device 16 may be embodied as any portable electronic device having wireless communication such as, but not limited to, smartphones, tablets, and the like.

The sensing system 18 may include a number of wireless communication transceivers 22 disposed in the vehicle 12. According to one embodiment, the wireless communication transceivers 22 may be variously located about the vehicle 12 such that each wireless communication transceiver 22 has a unique position or alternatively located in close proximity to each other. In operation, the wireless communication transceivers are configured to interact with the electronic device 16 in order to detect its presence within the vehicle 12. In a specific example, the wireless communication transceivers 22 may be configured to communicate with the electronic device 16 using Bluetooth™ low energy signals.

In alternative embodiments, the sensing system 18 may utilize other forms of wireless communication between the wireless communication transceivers 22 and the electronic device 16 such as, but not limited to, Wi-Fi™ The wireless communication transceivers 22 are each configured to transmit and receive wireless signals (e.g., Bluetooth™ low energy signals) to and from the electronic device 16. Each of the wireless communication transceivers 22 may be aware of its location within the vehicle 12 and is capable of sharing its location with the electronic device 16. Additionally, the wireless communication transceivers 22 may mutually communicate with the controller 20. The electronic device 16 may include one or more applications 24 stored thereon to enable the electronic device 16 to interface with the wireless communication transceivers 22. In some embodiments, the applications 24 may also enable the electronic device 16 to interface with the controller 20. In one specific example, the applications 24 may enable the electronic device 16 to wirelessly transmit trip information to the controller 20, which processes the trip information to determine a destination of the vehicle occupant carrying the electronic device 16.

The controller 20 may be a dedicated or shared controller and may include a processor 26 and a memory 28 having instructions thereon that are executable by the processor 26. The instructions may include one or more routines such as a light control routine 30 and a location sensing routine 32. According to one embodiment, the location sensing routine 32 may utilize the signal strength and time to return of the signals between the wireless communication transceivers 22 and the electronic device 16 to triangulate the cabin location of the electronic device 16. In so doing, the controller 20 may determine a seating area in which the electronic device 16, and by extension, the vehicle occupant, is located.

With continued reference to FIG. 1, the controller 20 may communicate with vehicle equipment 34 to receive information indicating that the departure of the vehicle occupant from the vehicle 12 is imminent. In the depicted embodiment, the vehicle equipment 34 includes a navigation system 36 and a body control module (BCM) 38, each of which provides information to the controller 20 that may be used to determine the operation of the lights 14. For example, the navigation system 36 may provide the controller 20 with information related to the progress of a trip (e.g., ETA, distance, etc.) and the BCM 38 may provide the controller 20 with information related to the vehicle 12 such as a door status (e.g., locked/unlocked), a seat belt status (e.g., buckled/unbuckled) status, a vehicle speed, etc. According to one embodiment, the light control routine 30 may selectively operate the lights 14 in response to the detected cabin location of the electronic device 16 and information (e.g., supplied by the navigation system 36 and/or BCM 38) indicative of an impending departure of the vehicle occupant from the vehicle 12. In one specific example, the light control routine 30 may operate only the lights 14 associated with the seating area in which the electronic device 16 is located when the vehicle 12 approaches or reaches a drop off point of the vehicle occupant. For purposes of disclosure, the term "vehicle occupant" should be seen to encompass any vehicle occupant, including a passenger and a driver of the vehicle 12.

Figure 2:
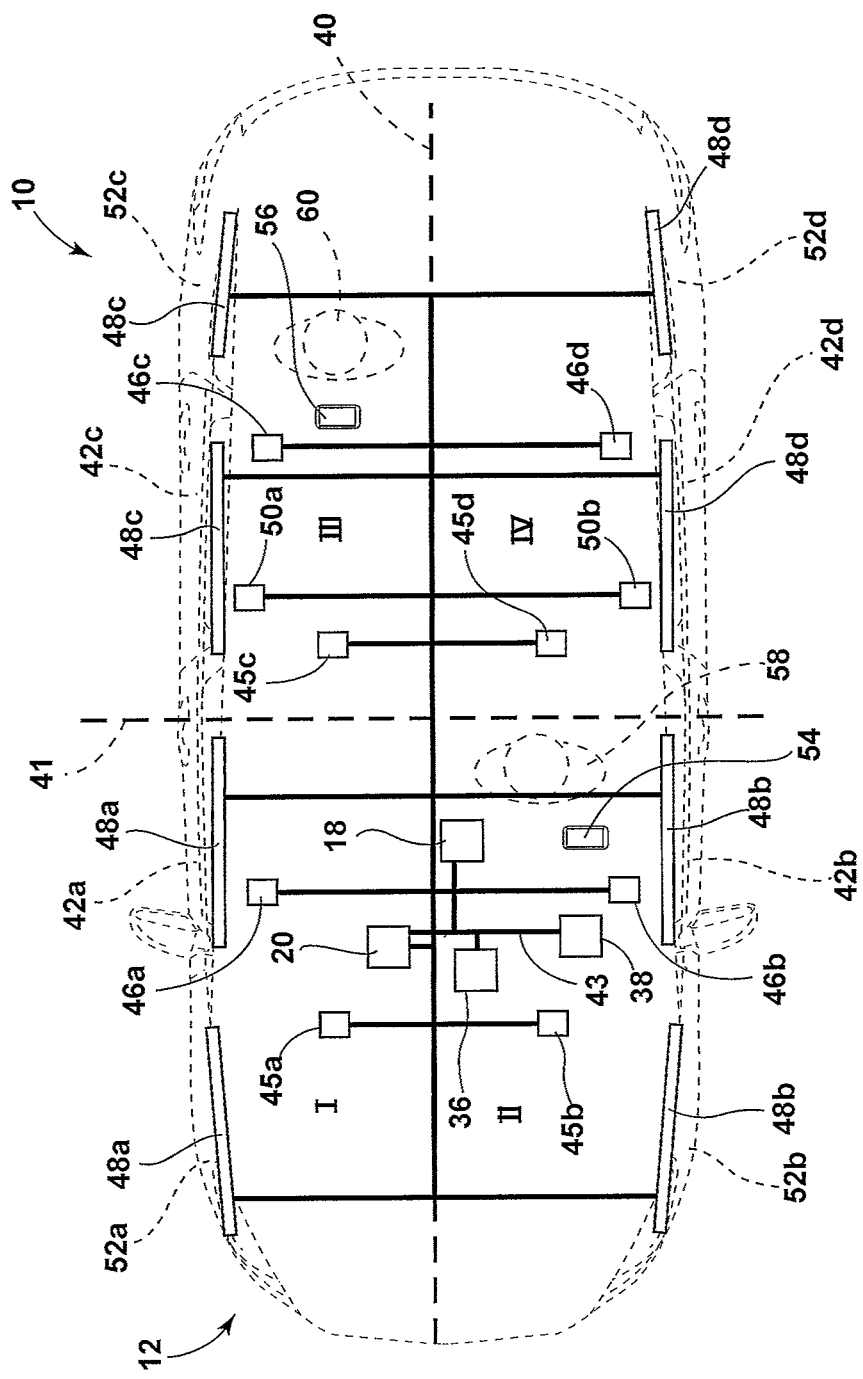
FIG. 2 is a schematic diagram of the lighting system according to one embodiment.

Referring to FIG. 2, the vehicle 12 is exemplarily shown as having four seating areas I-IV defined by longitudinal axis 40 and lateral axis 41. In the depicted embodiment, seating area I corresponds to a front passenger seating area, seating area II corresponds to a driver seating area, seating area III corresponds to a rear passenger-side seating area, and seating area IV corresponds to a rear driver-side seating area. Entry to each seating area I-IV is provided through respective doors 42a-42d. Thus, for purposes of illustration, and not limitation, the vehicle 12 is described herein as a four-door vehicle having two rows of seats. In alternative embodiments, the vehicle 12 may have more or less seating areas (e.g., coupes, vehicles with third row seating, etc.).

As depicted, the controller 20 may be communicatively coupled to the sensing system 18, the navigation system 36, and the BCM 38 over a first vehicle network such as a CAN bus 43. Additionally, the controller 20 may be operably coupled to the lights 14 over a second vehicle network such as LIN bus 44. In the present embodiment, the lights 14 include lights 45a-45d, 46a-46d, 48a-48d, 50a, and 50b. Specifically, lights 45a-45d each correspond to a footwell light and are each uniquely located in a corresponding seating area I-IV of the vehicle 12. Lights 46a-46d each correspond to an interior door grab handle light and are each uniquely located in a corresponding seating area I-IV of the vehicle 12. Lights 48a-48d are each uniquely associated with a corresponding seating area I-IV and each correspond to a light strip extending across an exterior side structure of the vehicle 12. For example, light 48a is associated with seating area I and generally extends across a front passenger side quarter panel 52a and door 42a. Light 48b is associated with seating area II and generally extends across a driver side quarter panel 52b and door 42b. Light 48c is associated with seating area III and generally extends across a rear passenger-side quarter panel 52c and door 42c. Light 48d is associated with seating area IV and generally extends across a rear driver-side quarter panel 52d and door 42d. Lights 50a and 50b each correspond to an overhead light and are each uniquely located in a corresponding seating area III, IV of the vehicle 12. Lights 45a-45d, 46a-46d, 48a-48d, 50a, and 50b may be powered using a vehicle power supply (not shown) and may be conventionally assembled in their respective locations. Additional information regarding the construction and implementation of exterior strip lights can be found in U.S. Patent Publication No. 2015/0307020 to Salter et al., entitled "ILLUMINATED EXTERIOR STRIP," of which is incorporated herein by reference in its entirety.

With continued reference to FIG. 2, a first and second electronic device, exemplarily shown as smartphones 54 and 56, respectively, are each located within the vehicle 12 and are each generally in the detection range of the sensing system 18. In embodiments employing the wireless communication transceivers 22, the controller 20 may triangulate the cabin location of the smartphones 54, 56 based on the signal strength and time to return of the signals between the wireless communication transceivers 22 and each of the smartphones 54, 56. Once the respective cabin location of the smartphones 54, 56 is known, the controller 20 may assign each smartphone 54, 56 to the seating area I-IV in which the smartphone 54, 56 is located. For instance, the controller 20 would assign the cabin location of smartphone 54 to seating area II and the cabin location of smartphone 56 to seating area III. As the trip progresses, the controller 20 may continue to monitor the cabin location of the smartphones 54, 56 through sustained communication with the sensing system 18 and reassign the smartphones 54, 56 to other seating areas I-IV should changes to their detected cabin locations dictate that reassignment is necessary.

While the detection and subsequent monitoring of the smartphones 54, 56 is underway, the controller 20 may also be supplied information indicating the impending departure from the vehicle 12 of an occupant (e.g., driver 58) carrying smartphone 54 and/or an occupant (e.g., passenger 60)

carrying smartphone 56. As described herein, the information may be provided by the navigation system 36, the BCM 38, the smartphones 54, 56, or a combination thereof. However, it is contemplated that the controller 20 may source information from other vehicle equipment as will be apparent to a skilled artisan. In response to the information, the controller 20 may selectively operate or, in other words, activate, only the lights (e.g., lights 45b, 46b, and 48b; and lights 45c, 46c, 48c, and 50a, respectively) of the corresponding seating area (e.g., seating areas II and III, respectively) associated with the detected cabin location of smartphones 54 and/or 56. As exemplarily described in the following scenarios, the controller 20 may variously operate the lights 45b, 46b, 48b associated with seating area II and the lights 45c, 46c, 48c, 50a associated with seating area III based on the source of the information.

In a first specific scenario, the controller 20 receives information exclusively from the navigation system 36, which provides the controller 20 with information indicating that a destination is approaching. For purposes of illustration, it is assumed that the information pertains to a destination common to both the driver 58 and the passenger 60. The destination may have been set by the driver 58 or correspond to a previous destination recognized by the controller 20. Thus, it is contemplated that the controller 20 may store previous destinations and distinguishes between previous destinations that are commonly frequented and those that are less frequented. In one embodiment, the controller 20 activates the lights 45b, 46b, 48b associated with seating area II and the lights 45c, 46c, 48c, 50a associated with seating area III when the information supplied from the navigation system 36 indicates that the vehicle 12 is within a predetermined or selectable distance (e.g., 0.5 miles) from the destination and/or decreasing in speed as the vehicle 12 nears the destination. For example, lights 45b, 46b, and 48b and lights 45c, 46c, 48c, and 50a may increase in intensity the closer the vehicle 12 is to the destination. Once the vehicle 12 arrives at the destination, lights 45b, 46b, and 48b and lights 45c, 46c, 48c, and 50a may each be operated at full intensity. The intensity of lights 45b, 46b, 48b and lights 45c, 46c, 48c, 50a may be determined based on information provided to the controller 20 from ambient light sensors, rain sensors, and other conventional sensors employed by vehicles for detecting lighting conditions in an operating environment of the vehicle 12.

Upon arrival at the destination, the controller 20 may modify the operation of lights 45b, 46b, and 48b based on the actions of the driver 58 carrying smartphone 54 and lights 45c, 46c, 48c, and 50a based on the actions of the passenger 60 carrying smartphone 56. For example, the driver 58 and passenger 60 may each unbuckle their seatbelts, open their respective doors 42b, 42c, or engage in other actions indicating departure from the vehicle 12 (e.g., turn vehicle 12 OFF), thereby prompting the BCM 38 to provide information indicating the same to the controller 20. In response, the controller 20 may initiate a dimming sequence of lights 45b, 46b, and 48b and lights 45c, 46c, 48c, and 50a. In some embodiments, the controller 20 may deactivate lights 45b, 46b, and 48b and lights 45c, 46c, 48c, and 50a following the vehicle 12 being turned OFF, elapsing of a predetermined or selectable time period, detection of the corresponding smartphone 54, 56 to be outside the vehicle 12, failure to detect the corresponding smartphone 54, 56 due to it being beyond the detectable range of the sensing system 18, a combination thereof, or other conditions apparent to the skilled artisan. Alternatively, the controller 20 may maintain lights 45b, 46b, and 48b and lights 45c, 46c, 48c, and 50a at full intensity pursuant to the above described conditions. In one specific embodiment, the controller 20 may operate lights 48b and 48c to flash upon the vehicle 12 arriving at the destination, thereby signaling to onlookers that the driver 58 and the passenger 60 are about to depart from the vehicle 12. Alternatively, the controller 20 may operate lights 48b and 48c to flash upon receiving information from the BCM 38 that the driver 58 and the passenger 60 have unbuckled their seatbelts, opened their respective doors 42b, 42c, or engaged in other actions indicating departure from the vehicle 12. With respect to lights 48b and 48c, it is contemplated that certain sections thereof may be made to illuminate or flash at different intensities to create additional lighting effects.

In a second specific scenario, the controller 20 receives information from smartphone 56 indicating that a destination is approaching. For purposes of illustration, it is assumed that the destination is specific to passenger 60 and may be selected as such via application 24. In other instances, the passenger 60 may specify that the destination is common to the driver 58 or other passengers, if present, in which case light control may proceed according to the first specific scenario described above. When the information provided from smartphone 56 is specific to the passenger 60 carrying it, the controller 20 may activate only the lights 45c, 46c, 48c, 50a associated with the seating area III in which the smartphone 56 is detected when the information supplied therefrom to the controller 20 indicates the impending departure of the passenger 60 (e.g., the vehicle 12 is within a predetermined distance from the destination of passenger 60). Operation of the lights 45c, 46c, 48c, 50a as the vehicle 12 approaches and/or arrives at the destination may follow any of the implementations described above with respect to the first specific scenario. Upon arrival, operation of the lights 45c, 46c, 48c, 50a, may be further based on information from the BCM 38. In some embodiments, the lights 45c, 46c, 48c, 50a may be deactivated after a predetermined or selectable time period has elapsed following the vehicle 12 leaving the destination after dropping off the passenger 60 carrying smartphone 56. Regarding the presently described scenario, it should be appreciated that information supplied to the controller 20 from smartphone 56 may take precedence over other information communicated to the controller 20 (e.g., information supplied from the navigation system 36) with respect to the operation of the lights 45c, 46c, 48c, 50a associated with the seating area III in which the smartphone 56 is detected.

In a third specific scenario, no information is provided to the controller 20 from the navigation system 36 or the either of the smartphones 54, 56. Accordingly, when the vehicle 12 arrives at an unspecified destination, lights 45b, 46b, and 48b and lights 45c, 46c, 48c, and 50a may be selectively operated based on information received from the BCM 38. Thus, if the driver 58 unfastens his or her seatbelt or opens door 42b, the controller 20 may activate the lights 45b, 46b, 48b associated with the seating area II. Similarly, if the passenger 60 unfastens his or her seatbelt or opens door 42c, the controller 20 may activate the lights 45c, 46c, 48c, 50a associated with seating area III.

In instances where an occupant carrying an electronic device moves between seating areas, the controller 20 may reassign a seating area to the electronic device and operate the lights associated with the reassigned seating area if information received by the controller 20 indicates the impending departure of the occupant carrying the electronic device. For example, if it is detected that the passenger 60 carrying smartphone 56 moves into seating area IV while a departure event is underway, the controller 20 may activate the lights 45d, 46d, 48d, 50d associated with seating area IV according to the any of the implementations described herein. The lights 45c, 46c, 48c, 50a associated with the previously detected seating area III of smartphone 56 may be left ON for a period of time or otherwise deactivated pursuant to the smartphone 56 being detected in seating area IV.

While several scenarios have been separately presented above, it will be understood that the implementations described in those scenarios may be combined. For example, in one implementation, the controller 20 may activate the lights associated with a given seating area based on a combination of vehicle speed, distance to destination, and one or more user actions such as, but not limited to, unlocking a door, unfastening a seatbelt, and moving towards a door.

Figure 3:
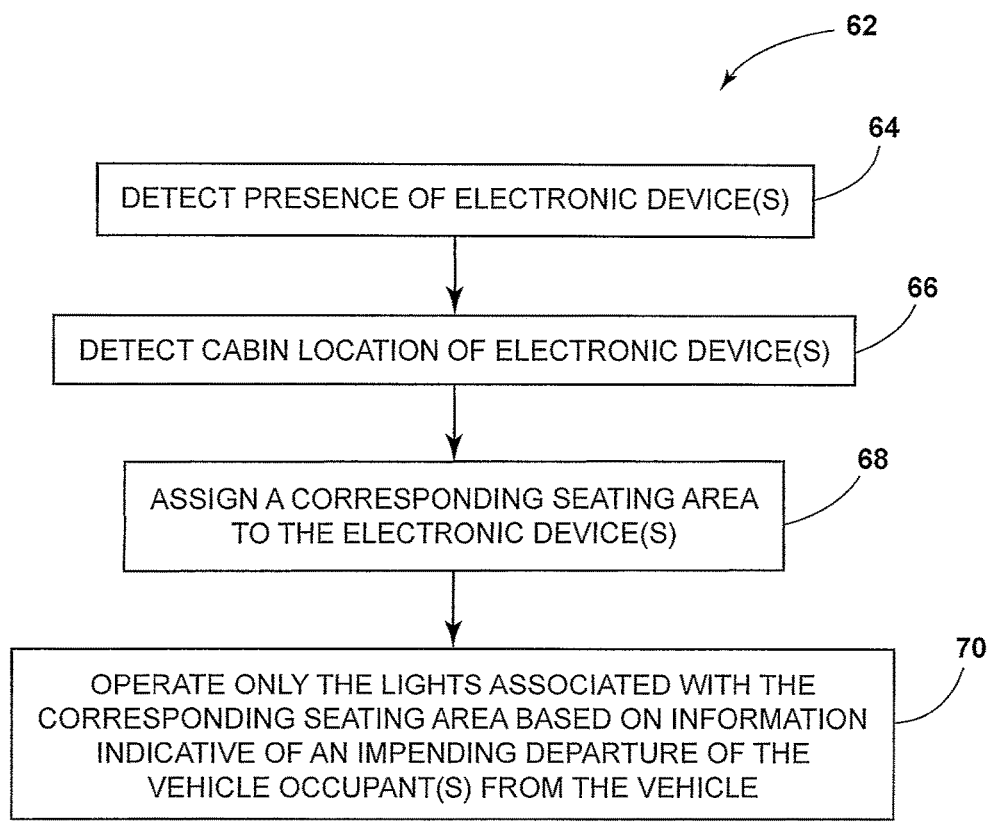
FIG. 3 is a method of controlling the lights of the vehicle and is implemented using the lighting system shown in FIGS. 1 and 2.

Referring to FIG. 3, a method 62 of controlling the lights 14 of the vehicle 12 is shown according to one embodiment. The method 62 may be executed by the controller 20 and the lights 14 may include those described in FIG. 2 and/or other lights of the vehicle 12. At step 64, the sensing system 18 detects the presence of one or more electronic devices 16, each being carried by a vehicle occupant. At step 66, the controller detects a cabin location of each of the electronic devices 16 based on the signal strength and time to return of the signals between the wireless communication transceivers 22 and each of the electronic devices 16. At step 68, the controller 20 assigns a corresponding seating area (e.g., seating areas I-IV) to each of the electronic devices 16. At step 70, the controller 20 operates only the lights 14 associated with the corresponding seating area based on information indicative of an impending departure of the vehicle occupant(s) from the vehicle 12.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A lighting system of a vehicle, comprising:
    a number of lights;
    a portable electronic device carried by a vehicle occupant;
    a controller in communication with a sensing system onboard the vehicle and configured to:
        detect a cabin location of the electronic device, wherein the sensing system comprises a number of wireless communication transceivers and the controller is configured to detect the cabin location of the electronic device through triangulation of the signal strength and time to return of signals between the wireless communication transceivers and the electronic device;
        assign a seating area to the electronic device; and
        operate only the lights associated with the seating area based on information indicative of an impending departure of the vehicle occupant from the vehicle, wherein the controller operates the lights based on a seatbelt status or a door status communicated to the controller by the body control module.

2. The lighting system of claim 1, wherein the lights include exterior and interior vehicle lights.

3. The lighting system of claim 1, wherein the electronic device comprises a smartphone.

4. The lighting system of claim 1, wherein the information is provided from at least one of a navigation system, the body control module, and the electronic device.

5. The lighting system of claim 4, wherein the controller operates the lights if the information indicates that the vehicle is within a predetermined distance of a destination selected using the navigation system or the electronic device.

6. A method of controlling lights of a vehicle, comprising:
providing lights, each associated with a seating area of the vehicle;
using a controller coupled to a sensing system onboard the vehicle, wherein the controller is performing the steps of:
detecting a portable electronic device carried by a vehicle occupant;
assigning the portable electronic device to a corresponding seating area, wherein the sensing system comprises a number of wireless communication transceivers and the controller is configured to detect the cabin location of the electronic device through triangulation of the signal strength and time to return of signals between the wireless communication transceivers and the electronic device, wherein the controller operates the lights based on a seatbelt status or a door status communicated to the controller by a body control module; and
operating only the lights associated with the corresponding seating area based on information indicative of an impending departure of the vehicle occupant from the vehicle.

7. The lighting system of claim 6, wherein the lights include exterior and interior vehicle lights.

8. The lighting system of claim 6, wherein the information is provided from at least one of a navigation system, a body control module, and the electronic device.

9. The lighting system of claim 8, wherein the controller operates the lights if the information indicates that the vehicle is within a predetermined distance of a destination selected using the navigation system or the electronic device.

* * * * *